United States Patent [19]

Fukushima et al.

[11] 4,352,198
[45] Sep. 28, 1982

[54] X-RAY PHOTOGRAPHY CASSETTE

[75] Inventors: Osamu Fukushima; Masahide Akisada; Yoshiyuki Monma, all of Minami-ashigara; Kazuaki Kitamura, Tokyo, all of Japan

[73] Assignee: Fuji Photo Film Co., Ltd., Kanagawa, Japan

[21] Appl. No.: 115,326

[22] Filed: Jan. 25, 1980

[30] Foreign Application Priority Data

Jan. 26, 1979 [JP] Japan .................................. 54-8043

[51] Int. Cl.³ .......................................... G03D 41/16
[52] U.S. Cl. ..................................... 378/185; 378/188
[58] Field of Search ........................ 250/480, 481, 482

[56] References Cited

U.S. PATENT DOCUMENTS 2,878,389  3/1959  Raffman ............................. 250/481
3,836,783  9/1974  Stievenart .......................... 250/481
3,928,770  12/1975  Turner ............................... 250/481

Primary Examiner—Craig E. Church
Attorney, Agent, or Firm—Sughrue, Mion, Zinn, Macpeak & Seas

[57] ABSTRACT

An X-ray photography cassette incorporating an automatic peeler for removing the film from the cassette. The cassette includes a frame and a front plate mounted on the frame and with a rear cover coupled to the frame through hinges. Intensifying screens are positioned adjacent the front and rear cover. A peeling member is elastically coupled to one of the frame or rear cover and extending into a recess or cut-out portion formed in the intensifying screen. A space is provided between the peeling member and the other intensifying screen for receiving the film.

5 Claims, 9 Drawing Figures

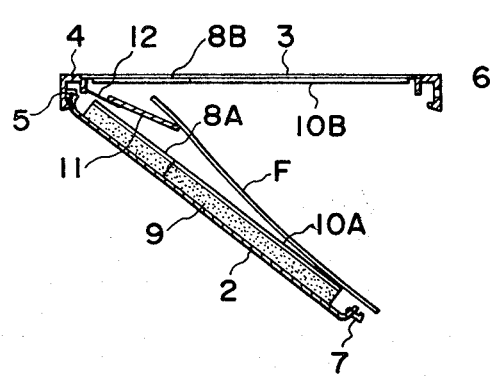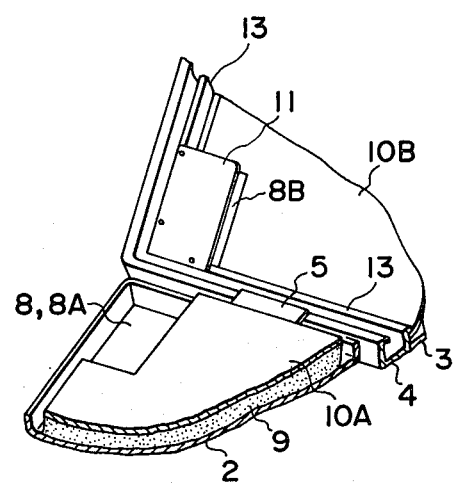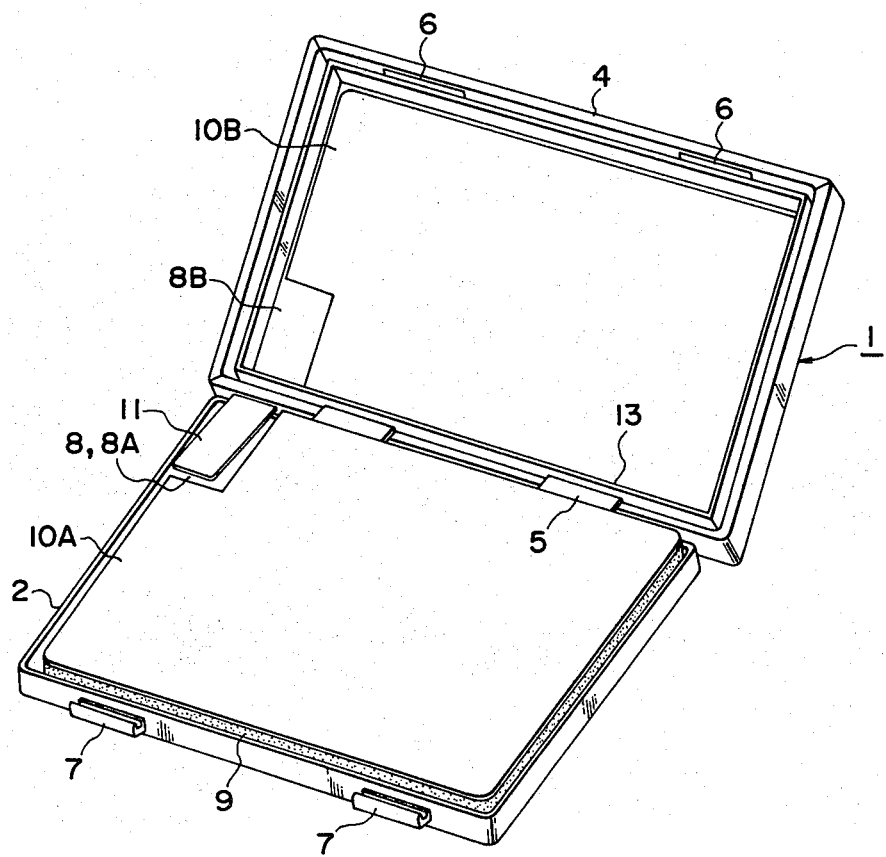

X-RAY PHOTOGRAPHY CASSETTE

BACKGROUND OF THE INVENTION

The present invention relates to X-ray photography cassettes in which a rear cover is coupled through hinges to a body with a front plate and intensifying screens are held upon the inner surfaces of the front plate and the rear cover. More particularly, the invention relates to an X-ray photography cassette in which a loaded film having a tendency to stick onto the intensifying screens can be peeled off.

For high sensitivity, X-ray photography is carried out with a film sandwiched between two intensifying screens. If the film is placed in close contact with the intensifying screens, the taken picture will have a quite excellent sharpness. An X-ray photography cassette in which the rear cover is coupled through hinges to the body has been extensively employed because the film can be loaded and unloaded automatically and mechanically as well as manually. The curvature of the rear cover and the quality and the thickness distribution of the corresponding depressing material such as a sponge material interposed between the rear cover and the intensifying screen are determined so that the film is maintained in close contact with the intensifying screen by the pressure between the front plate and the rear cover which results when the rear cover is closed.

The film and the intensifying screen thus held in close contact with each other tend to stick to each other because of vacuum conditions, humidity or static electricity. This tendency increases as the contact between the film and the intensifying screen increases. Therefore, such an X-ray photography cassette suffers from a defect in that it is difficult to peel the film off the intensifying screen when the film is taken out of the cassette.

For a film unloading apparatus which automatically takes out the film which has been loaded in the X-ray photography cassette and exposed to X-rays and delivers it to an automatic developing machine or the like, a system is employed in which the X-ray photography cassette is loaded in the cassette loading section of the apparatus with the rear cover held under it and the loaded film is allowed to drop by its own weight (hereinafter referred to as "a gravity drop system" when applicable) when the rear cover is opened. The mechanism and operation of this device are very simple. In taking the film out of the cassette using the gravity drop system, as described above, sometimes the film sticks onto the intensifying screen because of vacuum, humidity or static electricity. For eliminating this difficulty, the present applicant earlier proposed a cassette cover opening mechanism as disclosed in Japanese Utility Model Application No. 45067/1975 in which means for vibrating the body and the rear cover of a cassette after its cover has been opened is provided.

Furthermore, known in the art is an X-ray photography cassette which has a cut-out portion which forms an air pool in order to peel the film off the intensifying screen by negative pressure which is created when the cover of the cassette is opened. Such a cassette is described in Japanese Utility Model Application No. 121247/1972 also filed by the present applicant. If these techniques are employed, in almost all cases the film can be peeled off the intensifying screen and dropped from the cassette. However, sometimes the film sticks onto the intensifying screen on the rear cover which results in it taking a relatively long time to peel the film off the intensifying screen.

Examples of a conventional cassette including means for peeling film which is stuck onto an intensifying screen retained on the cassette utilizing spring means are disclosed in Japanese Utility Model Application Publication No. 29981/1964 which describes the use of an elastic plastic material such as a foamed plastic material provided in a cut-out portion formed in the intensifying screen on the body side so that the elastic plastic material is depressed and contracted when the rear cover is closed and that the elastic plastic material raises the film to peel it off the intensifying screen when the rear cover is opened.

However, these conventional cassettes are still disadvantageous in the following points. Since the spring means or the elastic plastic material protrudes from the surface of the intensifying screen when the rear cover is opened, the end of the film tends to be caught by the spring means or the elastic plastic material or the film is lifted so as to make it impossible to stably position the film while automatically loading the film in the cassette. Furthermore, in a cassette in which the film is maintained energized so as to be repelled from the intensifying screen, contact between the film and the intensifying screen is reduced.

In addition, a cassette is known in which, as described in U.S. Pat. Nos. 3,504,180 and 3,511,990, the intensifying screen is bent to peel the film off the intensifying screen when the cover is opened. However, this cassette construction is disadvantageous in that the construction of the cassette is intricate and the durability of the intensifying screen is adversely affected.

Accordingly, an object of the present invention is to provide an X-ray photography cassette in which a film can be smoothly loaded, the film is maintained in close contact with the intensifying screen when the rear cover is closed, and the film can be easily peeled off the intensifying screen when the rear cover is opened to take the film out of the cassette.

SUMMARY OF THE INVENTION

The foregoing object and other objects of the invention have been achieved by the provision of an X-ray photography cassette in which a rear cover is mounted through hinges to a body with a front plate and intensifying screens are held on the inner surfaces of the front plate and rear cover and in which, according to the invention, a peeling member adapted to peel a film loaded in the cassette off the intensifying screens is provided on the body or the rear cover in such a manner that the peeling member is in alignment with a cut-out portion in one of the intensifying screens and there is a space provided between the peeling member and the intensifying screen retained on the front plate or the rear cover.

The preferred embodiments of the invention will be described with reference to the accompanying drawings.

BRIEF DESCRIPTION OF THE DRAWINGS

FIGS. 1 and 6 are perspective views showing first and second embodiments of an X-ray photography cassette according to the present invention;

FIGS. 4 and 9 are sectional views showing the X-ray photography cassettes with the covers opened in order to unload the film; and FIG. 5 is a perspective view showing a modification of the X-ray photography cassette shown in FIG. 1.

DESCRIPTION OF THE PREFERRED EMBODIMENTS

First, one example of an X-ray photography cassette according to the invention in which a film is peeled off the intensifying screen held on the inner surface of the rear cover will be described.

Figure 1:
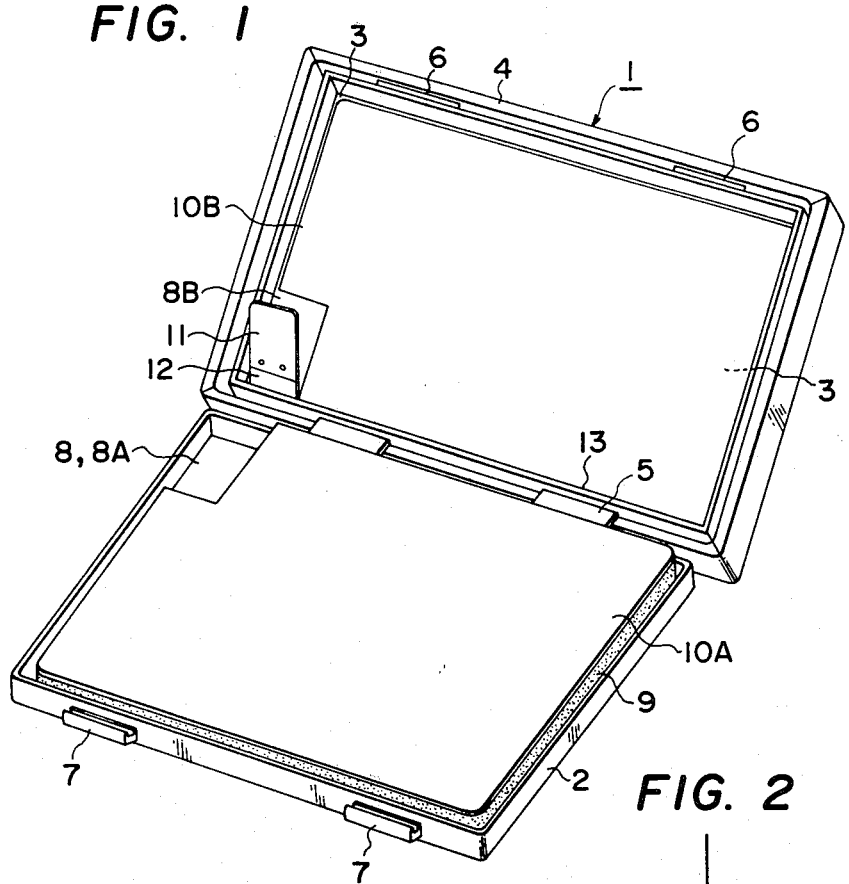
Figure 2:
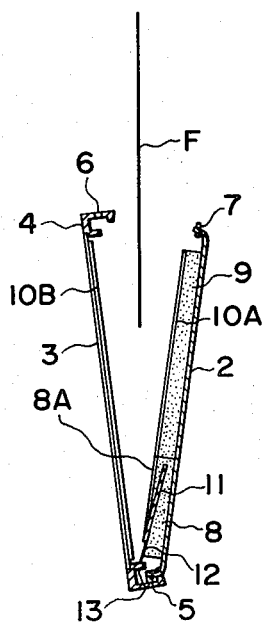
FIGS. 2 and 7 are sectional views illustrating the first and second embodiments of the X-ray photography cassette with the cover opened in order to load a film therein.
Figure 3:
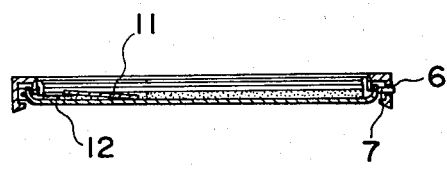
FIGS. 3 and 8 are sectional views of the first and second embodiments showing the X-ray photography cassettes with the covers closed.

FIG. 1 is a perspective view showing an X-ray photography cassette according to the invention with the rear cover widely opened. FIG. 2 is a sectional view of an X-ray photography cassette whose rear cover is opened for loading a film using the gravity drop system. FIG. 3 is a sectional view of the X-ray photography cassette whose rear cover is closed after a film has been loaded. FIG. 4 is a sectional view showing the X-ray photography cassette of which the rear cover has been opened for removal of the loaded film out of the cassette using the gravity drop system.

With reference to FIG. 1, such an X-ray photography cassette includes a body 1 and a rear cover 2. The body 1 includes a front plate 3 and a frame 4. One side of the rear cover 2 is coupled through hinges 5 to one side of the frame 4 so that the cassette can be freely opened and closed. Movable closure members 7 are provided on the opposite side of the rear cover 2 for locking the rear cover 2 via locking holes 6 formed in the opposite side of the frame 4. A depressing member 9 is provided on the inner surface of the rear cover. The depressing member 9 has a relatively great thickness and is made of an elastic material such as sponge. The depressing member 9 has a cut-out portion 8 at one corner. A rear intensifying screen 10A and a front intensifying screen 10B, which have cut-out portions 8A and 8B corresponding to the cut 8 of the depressing member 9, respectively, are attached to the surface of the depressing member 9 and on the inner surface of the front plate 3, respectively.

The structure of the X-ray photography cassette described up to this point is the same as that of a conventional cassette. However, the X-ray photography cassette of the invention differs from the conventional cassette in that peeling member 11 is provided. The peeling member 11 includes a leaf spring 12 attached to the frame 4 in such a manner that its rises from the side having the hinges 5. A space into which the film is inserted is provided between the peeling member 11 and the front intensifying screen 10B. The top end of the peeling member 11 is spaced from said front plate 3 by more than a position corresponding to the surface of the second intensifying screen 10A which is supposed to extend to the cut-off portion 8A when the rear cover 2 is opened with the film loading device, and at least one portion of the peeling member 11 is closer to the front plate 3 than to the position corresponding to the surface of the second intensifying screen 10A when the rear cover 2 is opened with a film unloading device as will become more apparent from the description which follows.

In order to load the film in the X-ray photography cassette using the gravity drop system as shown in FIG. 2, the rear cover 2 is opened by an amount such that, when the film F is dropped, the film F is not strongly brought into frictional contact with the edges of the frame 4 or the surfaces of the intensifying screens 10A and 10B and the end of the film F reaches the inner wall 13 of the frame 4 which forms the bottom of the configuration shown in FIG. 2. If the rear cover 2 were to be widely opened, then the film F would bend and accordingly fly back when it reaches the inner wall 13 making it difficult to position the film F. In this case, the peeling member 11 should be spaced from the front plate 3 at a distance such that the drop of the film F is not interrupted. Under the condition that the top end of the peeling member 11 is spaced or opened as defined above, the other portions should be spaced from the front intensifying screen 10B by distances such that the film can be inserted between the peeling member and the front intensifying screen 10B. If the peeling member is opened too far, its position is automatically corrected by the rear cover 2. When the rear cover 2 is closed, the movable closure members 7 are engaged with the locking holes 6 as shown in FIG. 3. In this case, the position of the peeling member 11 is controlled by the rear cover 2 so that the distance between the peeling member 11 and the front plate 3 is reduced. However, the loaded film F is maintained in close contact with the rear intensifying screen 10A.

For unloading the loaded film F using the gravity drop system, the amount of opening of the rear cover 2 of the X-ray photography cassette is set such that, as shown in FIG. 4, the film F slides down the rear intensifying screen 10A. It is desirable that the amount of opening the rear cover 2 is such that the film F can slide down without changing its posture. The amount of opening of the rear cover for unloading the film is larger than that used for loading the film. The rear cover 2 is opened as follows. A protrusion is inserted into the locking hole 6 to disengage the closure members 8 as a result of which the rear cover 2 opens under its own weight. In this operation, the peeling member 11 is restored to its original position upon being released from the rear cover 2.

For the method in which the rear cover 2 is opened downwardly as described above, the film F is easily peeled off the front intensifying screen 10B. Even if the film sticks to the front intensifying screen, the film can be peeled off the screen by shaking the front plate 3 with a technique disclosed by Japanese Utility Model Application No. 45067/1975 mentioned before. If the film sticks to the rear intensifying screen 10A, the film can be peeled off the screen by shaking the rear cover 2 in a manner disclosed in Japanese Utility Model Application No. 45067/1975. However, this technique may take somewhat more time. It should be noted though that, as shown in FIG. 4, the rear cover 2 is opened more widely than the case in which the film F is in contact with the peeling member 11. That is, the film F is forcibly lifted as a result of which the film F is immediately peeled off the back intensifying screen 10A and dropped.

In the above-described example of the X-ray photography cassette, the peeling member 11 is connected through the leaf spring 12 on the frame 4. However, the peeling member 11 may be modified so that it is made of an elastic material such as a leaf spring and is connected directly on the frame 4. The peeling member 11 may also be connected to the front plate 3 instead of the frame 4.

For an X-ray photography cassette whose construction is such that a film can be loaded using the gravity drop system, even if the amount of opening of the rear cover 2 is smaller, in the case of loading a film with the front plate 3 held below, the distance between the top end of the peeling member 11 and the front plate 3 may be made equal to or less than the distance between the front plate 3 and the rear cover 2 when the cover is closed making it unnecessary to elastically couple the peeling member 11 to the body including the front plate 3 and the frame 4. That is, in this case, the peeling member 11 may be fixedly secured to the corner of the inner wall 13 of the frame 4 as shown in FIG. 5 which is a perspective view of the relevant components.

Another example of an X-ray photography cassette in which a film is peeled off an intensifying screen held on the inner surface of the front plate, namely, the front intensifying screen 10B, will next be described. The film may stick to the front intensifying screen 10B when the rear cover is opened with the front plate 3 held below or when the rear cover is opened with the X-ray photography cassette held vertically.

Figure 7:
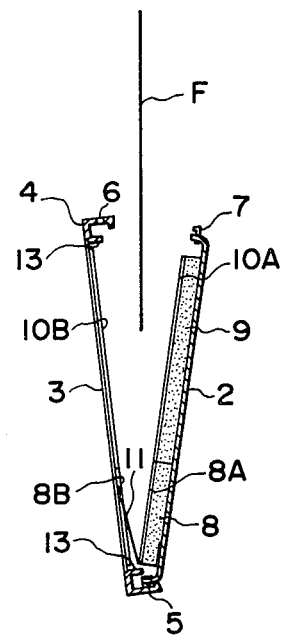
Figure 8:
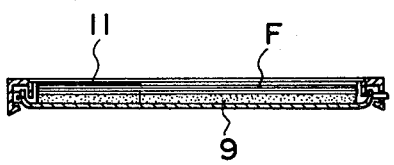
Figure 9:
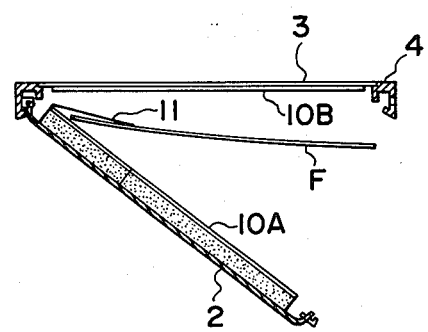

FIG. 6 is a perspective view showing the X-ray photography cassette with the rear cover opened widely. FIG. 7 is a sectional view of the X-ray photography cassette with the rear cover opened to a position suitably for loading a film using the gravity drop system. FIG. 8 is a sectional view of the X-ray photograph cassette in which a film has been loaded and the rear cover closed. FIG. 9 is also a sectional view of the X-ray photograph cassette with the rear cover opened to take the loaded film out using the gravity drop system.

The basic construction of the X-ray photograph cassette of this embodiment is similar to that of the X-ray photograph cassette shown in FIGS. 1 through 4. In this example, the peeling member 11 itself is made of an elastic material such as a leaf spring. It is desirable that the thickness of the peeling member 11 be made smaller than the thickness of the intensifying screen so that the front intensifying screen 10B may be brought into close contact with the loaded Film F. The cassette of this example differs from the previously described embodiment in which the film is peeled off the back intensifying screen in that the peeling member 11 is connected to the rear cover. The peeling member 11 is connected to the rear cover in such a manner that it rises from the side having the hinges 5 and there is left a space between the rear intensifying screen 10A and the peeling member 11 into which the film can be inserted. As will be described later, at least the top end of the peeling member 11 is spaced from the rear cover 2 by more than a position corresponding to the surface of the front intensifying screen 10B which is supposed to extend to the cutoff portion 8B when the rear cover 2 is opened with the film loading device and at least one portion of the peeling member 11 is closer to the rear cover 2 than to the position corresponding to the surface of the front intensifying screen 10B when the rear cover 2 is opened with the film unloading device.

The amount of opening of the rear cover 2 for loading the film into the X-ray photography cassette using the gravity drop system is similar to that described with reference to FIG. 2. In this case, there should be left a sufficiently great space between the peeling member 11 and the rear cover that the peeling member 11 does not obstruct the dropping film F. If at least the top end of the peeling member 11 opens as described above, then the other portion thereof can be spaced from the rear intensifying screen 10B by an amount such that the film can be inserted into the space. If the peeling member 11 is opened too far, its position will be automatically corrected by the front plate 3. Thus, the rear cover 2 may be closed as shown in FIG. 8. The amount of opening of the rear cover of the X-ray photography cassette, as shown in FIG. 9, is larger than that used for loading the film shown in FIG. 7. In this case, the peeling member 11, upon being released from the front plate 3, is restored. In the case where the cassette is opened with the rear cover 2 held below, the film may sometimes stick onto the front intensifying screen 10B. However, the film F is nonetheless forcibly peeled off the front intensifying screen 10B so that it can slide away because the rear cover 2 is opened more widely than its position at which the film F is in contact with the peeling member 11.

With the X-ray photography cassette constructed as described above according to the invention, the film can be positively peeled either off the front intensifying screen or the rear intensifying screen. If one peeling member 11 for peeling film off the front intensifying screen and another peeling member for peeling film off the rear intensifying screen are provided at positions where they do not interfere with each other then the film can be readily peeled off both intensifying screens when the rear cover is opened.

In the above-described embodiments, the film is unloaded using the gravity drop system. However, that is, in the case where the rear cover is opened above with the front plate held below so that the film on the front intensifying screen can be removed with the suction device, it is essential that the film be on the front intensifying screen. This requirement can be fully satisfied by an X-ray photography cassette which is provided with a peeling member adapted to peel the film off the back intensifying screen.

What is claimed is:

1. An X-ray photography cassette comprising a cassette body including a frame and a front plate coupled to said frame, hinge members for coupling a rear cover to said body, first and second intensifying screens positioned adjacent inner surfaces of said front plate and said rear cover, respectively, a peeling member adapted to peel a film loaded in said cassette off said second intensifying screen, said peeling member being coupled to said body at an inward point where said rear cover is hinged to said body in such a manner that said peeling member is in alignment with a cut-out portion formed in said second intensifying screen and is moved outward from said cut-out portion when said rear cover separates from said body to separate said film from said second intensifying screen, and a space being provided between said peeling member and said first intensifying screen for receiving said film to lie on said second intensifying screen.

2. An X-ray photography cassette as claimed in claim 1 further comprising means for elastically coupling said peeling member to said body so that said peeling member rises from the side of said hinges, at least a top end of said peeling member being spaced from said front plate and extending beyond said front plate by more than a position corresponding to the surface of said second intensifying screen when said rear cover is opened with a film loading device and at least one portion of said peeling member being closer to said front plate than to said position corresponding to the surface of said second intensifying screen when said rear cover is opened with a film unloading device.

3. An X-ray photography cassette comprising a cassette body including a frame and a front plate coupled to said frame, a rear cover coupled through hinges to said body, first and second intensifying screens positioned adjacent inner surfaces of said front plate and said rear cover, respectively, a peeling member adapted to peel a film loaded in said cassette off said first intensifying screen, said peeling member being coupled to said rear cover, and located at an inward point where said rear cover is hinged to said body in such a manner that said peeling member is in alignment with a cut-out portion formed in said first intensifying screen and is moved outward from said cut-out portion when said rear cover separates from said body to separate said film from said first intensifying screen, and a space being provided between said peeling member and said second intensifying screen for receiving said film to lie on said first intensifying screen.

4. An X-ray photography cassette as claimed in claim 3, further comprising means for elastically coupling said peeling member to said rear cover so that said peeling member rises from the side of said hinges, at least a top end of said peeling member being spaced from said rear cover and extending beyond said front plate by more than a position corresponding to the surface of said first intensifying screen when said rear cover is opened with a film loading device, and at least one portion of said peeling member being closer to said rear cover than to said position corresponding to the surface of said first intensifying screen when said rear cover is opened with a film unloading device.

5. The X-ray photography cassette of any of claims 1 to 4 wherein said peeling member comprises a leaf spring.

* * * * *